(12) United States Patent
Cheng et al.

(10) Patent No.: US 10,598,210 B2
(45) Date of Patent: Mar. 24, 2020

(54) DRIVE SHAFT

(71) Applicant: Zhejiang CFMOTO Power Co., Ltd., Hangzhou, Zhejiang (CN)

(72) Inventors: Fuying Cheng, Hangzhou (CN); Zhenxiang Kuang, Hangzhou (CN)

(73) Assignee: Zhejiang CFMOTO POWER Co., Ltd., Hangzhou (CN)

( * ) Notice: Subject to any disclaimer, the term of this patent is extended or adjusted under 35 U.S.C. 154(b) by 185 days.

(21) Appl. No.: 15/617,251

(22) Filed: Jun. 8, 2017

(65) Prior Publication Data
US 2017/0356502 A1   Dec. 14, 2017

(30) Foreign Application Priority Data

Jun. 8, 2016   (CN) ..................... 2016 2 0556604 U

(51) Int. Cl.
*F16D 3/18* (2006.01)
*F16C 3/02* (2006.01)

(52) U.S. Cl.
CPC .............. *F16C 3/023* (2013.01); *F16D 3/185* (2013.01); *F16C 2226/36* (2013.01); *F16C 2326/06* (2013.01); *Y10T 403/7035* (2015.01)

(58) Field of Classification Search
CPC .. F16C 3/023; F16C 2226/36; F16C 2326/06; F16D 3/185; Y10T 403/7035
USPC ........................................ 464/154, 156, 159
See application file for complete search history.

(56) References Cited

U.S. PATENT DOCUMENTS

| | | | | |
|---|---|---|---|---|
| 2,845,781 A | * | 8/1958 | O'Brien | B21B 35/143 464/156 |
| 3,243,973 A | * | 4/1966 | Kraeling | F16D 3/185 464/154 |
| 3,359,757 A | * | 12/1967 | Adams | F16D 3/2057 464/159 |
| 4,976,655 A | * | 12/1990 | Hebert, Sr. | B21B 35/144 464/156 |
| 5,007,880 A | * | 4/1991 | Walker | F16D 3/185 464/159 |
| 5,070,743 A | | 12/1991 | Simon | |
| 6,315,487 B1 | * | 11/2001 | James | F16D 1/027 |
| 7,066,025 B1 | | 6/2006 | Corbin | |
| 2015/0314347 A1 | * | 11/2015 | Yamamoto | F16D 3/185 |

OTHER PUBLICATIONS

Machinery's Handbook, 25th ed., New York, International Press, 1996, pp. 2060-2061. TJ151.M3 (Year: 1996).*

* cited by examiner

*Primary Examiner* — Greg Binda
(74) *Attorney, Agent, or Firm* — Shewchuk IP Services, LLC; Jeffrey D. Shewchuk

(57) ABSTRACT

A drive shaft is formed by welding two spline shaft heads to a hollow middle section of tubing. The spline shaft head includes teeth which are crowned to permit an angular offset of the drive shaft relative to cylindrical splines of connectors, such that the end faces of the teeth define a barrel shape. The teeth of the spline shaft head include a side face curvature, defining a football-shaped tooth cross-section. Torque is rotationally transmitted across a permitted angular offset of the drive shaft relative to cylindrically arranged linear splines of drive and driven connectors (i.e., relative to the engine output axis of rotation and the differential input axis of rotation), thereby avoiding the use of prior art universal joints.

19 Claims, 3 Drawing Sheets

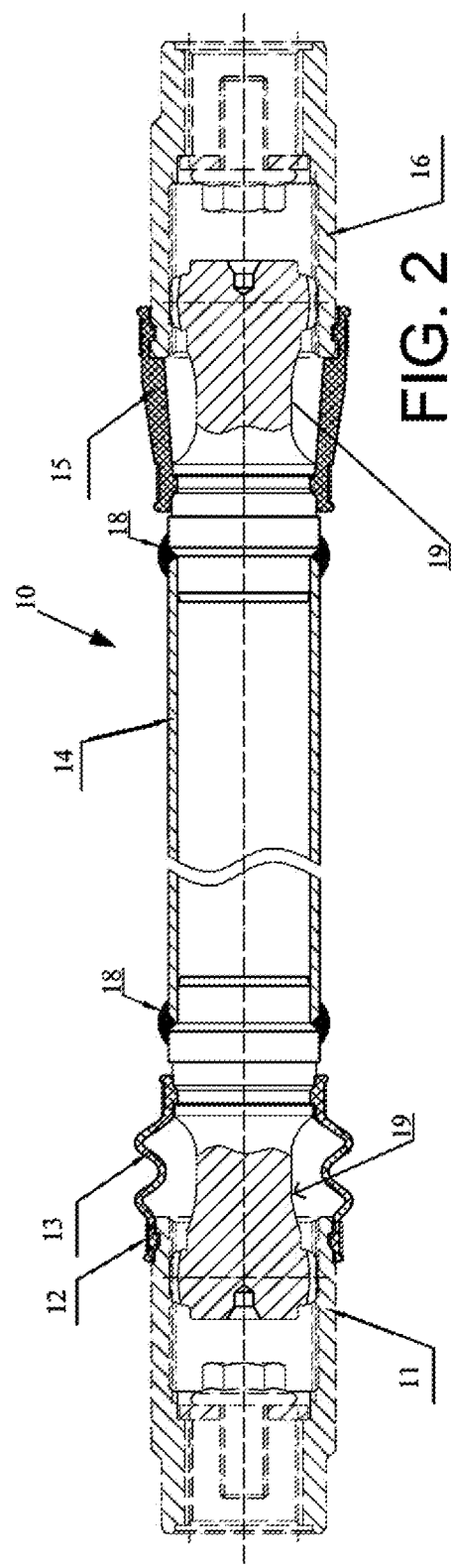
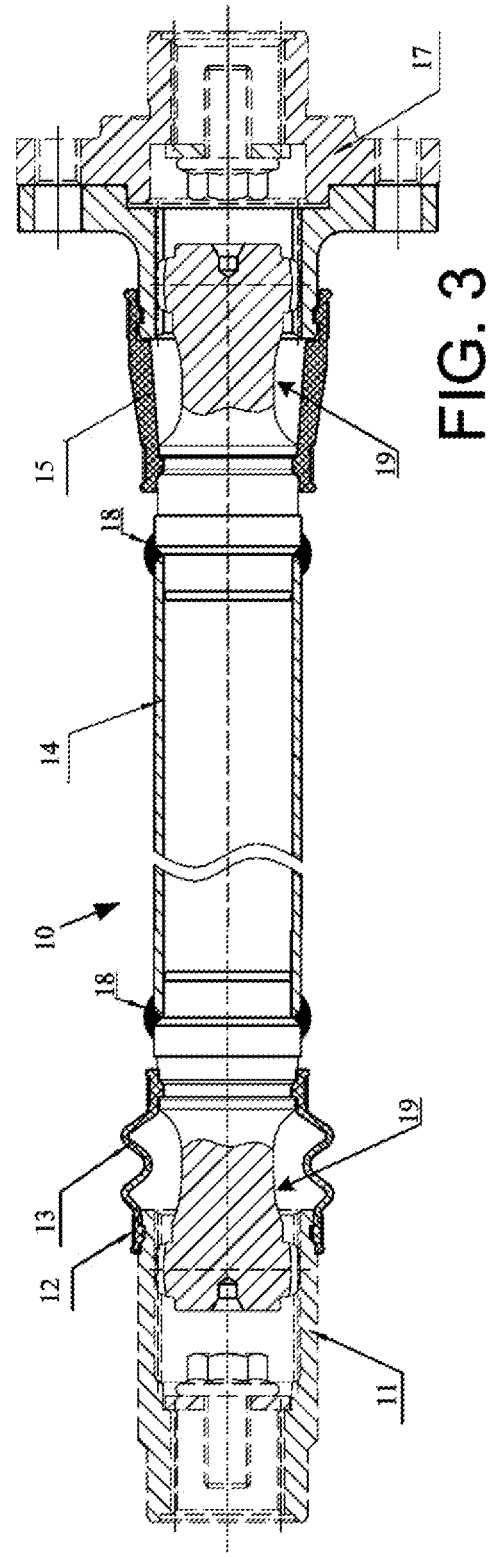

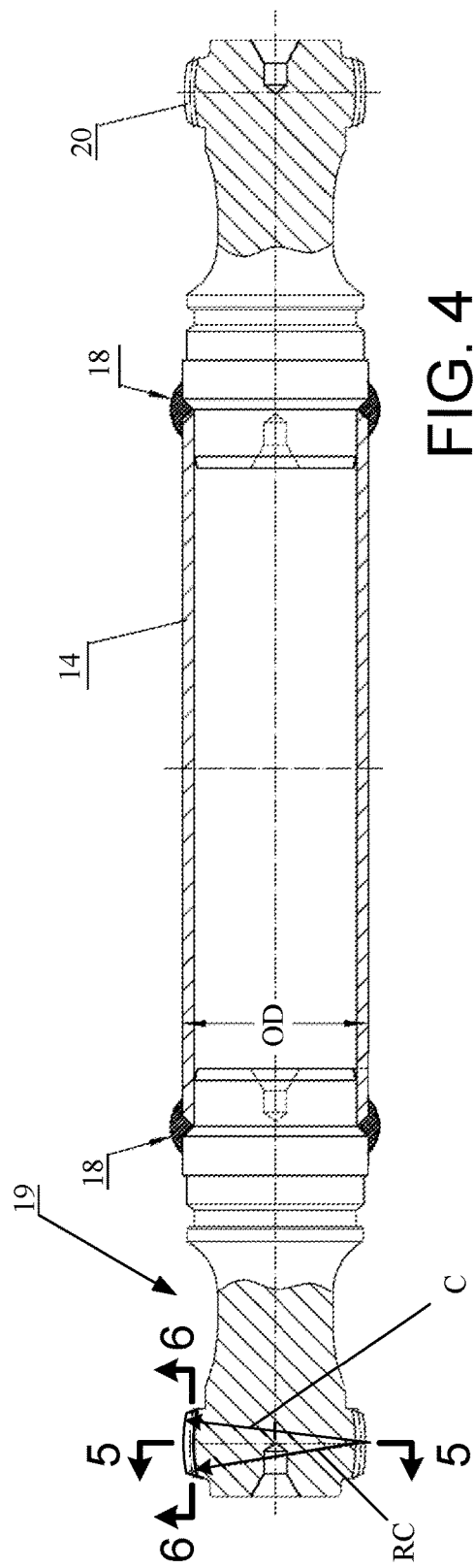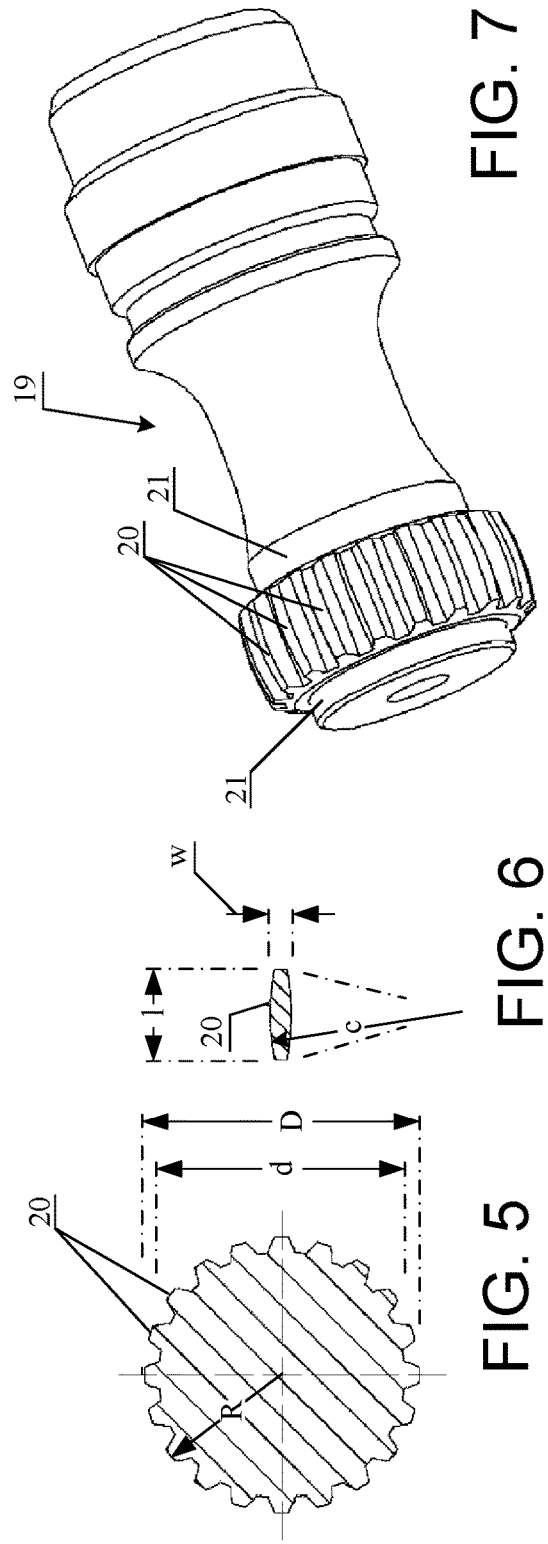

DRIVE SHAFT

CROSS-REFERENCE TO RELATED U.S. APPLICATION(S)

None.

FIELD OF THE INVENTION

The present invention relates to the field of wheeled land vehicles, and particularly to a type of drive shaft for transmitting power from the engine based on rotation of the drive shaft.

BACKGROUND OF THE INVENTION

Many prior art wheeled vehicles use a rotating drive shaft to transmit power from the engine to the wheels. For instance, the drive shaft may transmit power from the engine location to a differential spaced between two wheels, with the differential transmitting power from the drive shaft outward to half shafts driving each of the two wheels. In the manufacture of such vehicles, the engine, the drive shaft and the differential are separate components which are assembled together into the frame of the vehicle.

It may be desired for space and layout purposes to center the engine at a different transverse or vertical location than the differential, i.e., the axis of rotation of the engine output may not be linearly aligned with the axis of rotation of the differential input but instead may have a vertical, horizontal and/or angular offset. Different vehicles in the same line of vehicles may have different longitudinal spacing between the engine and the differential, requiring different lengths of drive shafts. Further, due to manufacturing and assembly tolerances, the offset spacing may not always be exactly identical from vehicle to vehicle on the assembly line, or the longitudinal length required of the drive shaft may not be exactly the same from vehicle to vehicle on the assembly line.

One mechanism that is commonly used to allow for different vertical, horizontal and/or angular offsets is a universal joint in the drive shaft as shown in FIG. 1. Each end of the drive shaft 1 includes a universal joint 2 made up of a cross-cardan joint 3 connected to a cross-cardan fork 4. Each cross-cardan joint 3 includes a flange 5 which can be bolted, shown bolted on the left to the terminal pad 6 on the engine and shown bolted on the right to the terminal pad 7 of the differential or other mount for the drive axle. Because the universal joint 2 can transmit torque across different bend angles, the universal joint 2 allows considerable flexibility in the vertical, horizontal and/or angular offset, both as designed and as assembled. In the prior art embodiment shown in FIG. 1, minor adjustments in length of the drive shaft 1 can be taken up by a mid-shaft spline connection 8. Alternatively, one of the cross-cardan joints 3 could have a splined connection (not shown) to either the engine output 6 or the differential input 7, to accommodate a variation in the length of the drive shaft 1.

While such drive shafts allow considerable flexibility, they have various disadvantages. Prior art drive shafts are commonly heavy in weight, decreasing the fuel economy and handling of the vehicle. The flange 5 for the bolted end connection has a large radius of rotation, requiring sufficient clearance to install the bolts 9, which may interfere with other vehicle layout objectives. Prior art drive shafts may have strong dynamic unbalance and induce strong vibrations in the operation of the vehicle, increasing wear on various vehicle components, resulting both in increased noise and reduced service life. The prior art drive shaft structures may have high manufacturing costs, particularly since assembly, maintenance and changing of the universal joints 2 is more complex. In addition, when prior art drive shafts are rough-cast with different lengths, multiple molds may be needed and the mold cost is increased. Better solutions are needed.

BRIEF SUMMARY OF THE INVENTION

The present invention is a drive shaft formed of several components including a middle section joined (such as by welding) to at least one and more preferably two spline shaft heads. In one aspect, the middle section is tubular and hollow. In another aspect, the spline shaft head includes teeth which are crowned to permit an angular offset of the drive shaft relative to cylindrical splines of connectors, such as defining a barrel shape. In another aspect, the teeth of the spline shaft head include a side face curvature, such as defining a football-shaped tooth cross-section. The present invention allows torque to be rotationally transmitted across the angular offset of the drive shaft relative to cylindrically arranged linear splines of drive and driven connectors, thereby avoiding the use of prior art universal joints.

BRIEF DESCRIPTION OF THE DRAWINGS

FIG. 2 is a side view, with a portion shown in cross-section, of the preferred embodiment of the present invention;

FIG. 3 is a side view, with a portion shown in cross-section, of the preferred embodiment of the present invention, showing an alternative engine and differential connection structures;

FIG. 4 is a side view, with a portion shown in cross-section, of the preferred embodiment of the present invention without either the engine or differential structure depicted;

FIG. 5 is a transverse cross-sectional view of the crowned spline head taken along lines 5-5 in FIG. 4;

FIG. 6 is a longitudinal cross-sectional view of a tooth of the crowned spline taken along lines 6-6 in FIG. 4;

FIG. 7 is a perspective view of the one of the crown spline heads.

Figure 1:
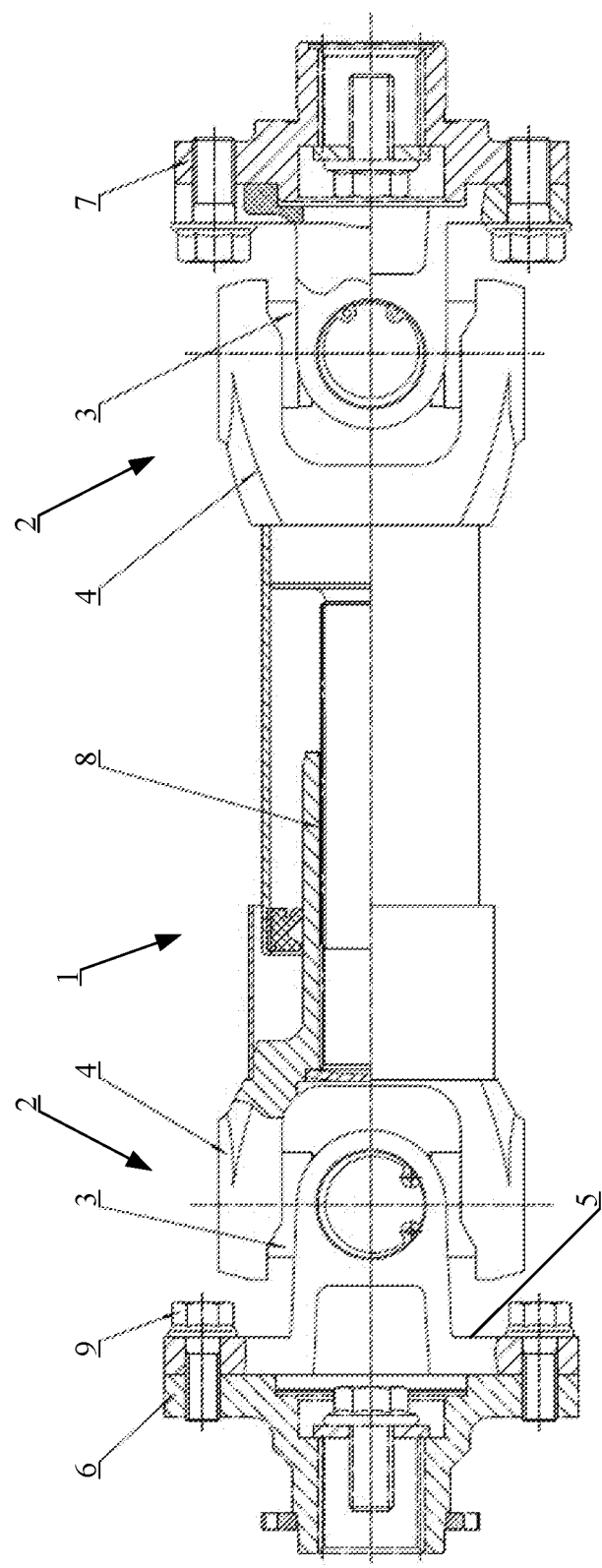
FIG. 1 is a side view, with a portion shown in cross-section, showing a prior art drive shaft.

In these Figures, reference numerals are as follows:
1 indicates the prior art drive shaft;
2 indicates the universal joint;
3 indicates the cross-cardan joint;
4 indicates the cross-cardan fork;
5 indicates the flange;
6 indicates the engine terminal pad;
7 indicates the differential terminal pad;
8 indicates the mid-shaft spline connection;
9 indicates the bolts;
10 indicates the drive shaft of the present invention;
11 indicates the first driving sleeve;
12 indicates the bundle ring;
13 indicates the corrugated sleeve cover;
14 indicates the tubular drive shaft center;
15 indicates the straight cover;
16 indicates the second drive sleeve;
17 indicates the connection plate;
18 indicates the welds;

19 indicates the spline shaft head;
20 indicates the teeth; and
21 indicates the recessed rings.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The drive shaft 10 of the present invention is a multi-component structure without any cardan U-joint, including a hollow central tubular section 14 joined, at least one end (and more preferably) at both of its ends, to a spline shaft head 19. Preferably the central tubular section 14 is formed of steel tubing, with the preferred steel tubing being a Chinese standard YB/T 5209 drive shaft with welded steel pipe. This tubing is strong and lightweight for the drive shaft torque transmission requirements of all-terrain vehicles, while still being relatively inexpensive. The tubing 14 is selected to be of sufficient size to transfer the torque required for the vehicle in question. For instance, FIGS. 2, 3, and 4 show tubing with an outer diameter OD of about 32 mm and a wall thickness of about 2 mm.

The preferred method of joining the spline shaft heads 19 to the central tubular section 14 is by having the spline shaft heads 19 include a central shoulder 21 extending into the inner diameter of the tube 14 and then welding the connection with welds 18. If desired for reduced inventory and cost considerations, the tube 14 itself may be formed by end-welding together two or more shorter sections of pipe.

The drive end connector includes a first drive sleeve 11, a bundle ring 12 and a corrugated sleeve 13. The first drive sleeve 11 is used for mounting on the engine (not shown). The corrugated sleeve 13 is matched with and protects the spline shaft head 19 shown at the left side of the central tube 14. The bundle ring 12 is arranged at the outer circumferential surface of the matching end of the corrugated sleeve 13 and the first driving sleeve 11, holding the corrugated sleeve 13 to the first drive sleeve 11.

The preferred driven end connector comprises the straight cover 15 and the second driven sleeve 16 as shown only in FIG. 2; wherein, the straight cover 15 is matched with and protects the spline shaft head 19 shown at the right side of the central tube 14. The second driven sleeve 16 is used for mounting on the drive axle or differential. In the preferred embodiments, the first drive sleeve 11 and the second driven sleeve 16 each have splined teeth which are linear and arranged to define a cylindrical, geared opening, mating with the cross-sectional profile shown in FIG. 5.

FIG. 3 shows an alternative embodiment, in which a connecting plate 17 is used for mounting on the drive axle, and in which the straight cover 15 is matched with the connecting plate 17. The embodiment of FIG. 3 can be used for prior art terminal pads 7 shown in FIG. 1. Other embodiments include a connecting plate for an engine terminal pad, or connecting plates for both the engine terminal pad and the differential terminal pad. Thus, it can be seen that while the present invention permits a benefit of a small radius of rotation of the embodiment of FIG. 2, the present invention can alternatively be used with the larger radius of rotation of the prior art.

The construction of the spline shaft head 19 is important for enabling the drive shaft 10 to transmit rotational power while permitting horizontal, vertical and angular offset between the engine output 11 and the differential input 16, and while still permitting some flexibility in longitudinal placement of the engine relative to the differential. The spline shaft head includes numerous teeth 20. The teeth 20 have a tooth length l extending between two recessed rings 21 positioned to ensure no interference with the drive end connector 11 and the driven end connector 16.

The number, size and shape of these teeth 20, detailed in FIGS. 4-7, help the spline shaft head 19 to better fulfill its functions. Each of these crown shaft teeth 20 include a curvature on their sides, so each tooth 20 is in cross-section somewhat football shaped as best shown in FIG. 6. Each of the teeth 20 also has a curvature on its face as best shown in FIG. 4, referred to as a crown curvature. With the crown curvature, the end faces of the teeth 20 collectively define a shape which is not a sphere but instead is more like a barrel. The length of the teeth 20, the number of teeth 20, and the various curvatures all interplay in proper design. For instance, in the preferred embodiment, the spline shaft head includes twenty crowned teeth 20, with spaces between the teeth 20 which are relatively equal in size to receive corresponding linear splines of the receivers 11, 16. The teeth 20 should be of sufficient size to transfer torque, but still have enough length and bite to permit a significant offset angle of at least 1° or more, such as having a difference between major diameter D and minor diameter d in the range of 1 to 8 mm (1 mm<D-d<8 mm) and a length l which is greater than the difference between major diameter and minor diameter and within a range of 2 to 20 mm. In the most preferred embodiment, the major diameter D of the teeth 20 matches the outer diameter OD of the drive shaft center 14, such as a major diameter D of 32 mm. With a major diameter D of 32 mm, the minor diameter d of the preferred teeth 20 is about 28.5 mm, with a most preferred tooth length l of 12 mm. With twenty teeth 20, each tooth 20 extends approximately 9° in circumference at its reference diameter (i.e., at the widest portion shown in FIG. 6). When operating with a design which has the head 19 of roughly the same diameter as the outer diameter OD of the drive shaft center 14 (in this embodiment, 32 mm), this results in a center tooth width w of about 2.5 mm.

The pressure angle for the teeth 20 also effects how the teeth 20 mesh with the spline teeth of the engine output 11 and the differential input 16. In the preferred embodiment, the pressure angle of the teeth 20 is in the range of 15 to 25°, such that the widest portion of each tooth at its major diameter D has a tooth width of about 1.7 mm and at its minor diameter d has a tooth width of about 3.3 mm. The tooth length l should be sufficient, based on the diameter of the shaft head, to enable 360° engagement with a cylindrical spline receiver 11, 16 at the desired maximum angular offset. To enable acceptable meshing of the spline teeth through a significant offset angle, each tooth side face includes a non-linear curvature. The tooth side face radius of curvature c should be selected to be sufficient to allow an acceptable tooth width at the ends of the tooth 20 to handle the stress of the drive torque of the vehicle at the maximum permissible offset angle. In most cases, this will result in a side face radius of curvature c that exceeds the radius of curvature R of the major diameter D. For instance, the preferred embodiment includes a tooth side face radius of curvature c of 25 mm, well in excess of the major diameter D radius of curvature R of 16 mm.

As best shown in FIG. 4, not only is the side face of each tooth curved, but the end face of each tooth is also crowned with a crown radius of curvature C, thereby also contributing to the offset angle which is achievable. The crown radius of curvature C preferably exceeds the radius of curvature of the major diameter D, and more preferably exceeds the side face radius of curvature c. In the most preferred embodiment, the crown radius of curvature C is slightly greater than twice the radius of curvature of the major diameter, such as a crown radius of curvature C of 32.5 mm. The recess between the teeth 20 is crowned similarly to the tooth end face, such as having a recess radius of curvature RC of 29.1 mm.

The resulting drive shaft 10 of the present invention is simple, and has a small radius of rotation and takes up a small space. Due to the hollow center section 14, the drive shaft 10 is light weight. The welding operation can be performed prior to assembly with the engine and the differential or in situ after the engine and differential are positioned and mounted in the vehicle frame, resulting in a lower overall manufacturing cost. The spline shaft heads 19 are also simpler and less costly than the prior art universal joints 2, further reducing cost. Maintenance and replacement of the resulting drive shaft 10 is also relatively simple. The drive shaft 10 is also more robust and less easy to damage than the prior art universal joints 2.

The amount of angular offset which can be achieved with the present invention depends on the size (installation clearances) of the straight cylindrical splines of the receivers 11, 16. To permit any angular offset, the cylinder defined by the receiver teeth end faces must have a diameter greater than the minor diameter d, the cylinder defined by the between-teeth-recess-faces of the receiver 11, 16 must have a diameter greater than the major diameter D, and the space separating teeth of the receivers 11, 16 must be greater than the tooth width w. For instance, workers skilled in the art will understand that, for vehicle layouts where the drive shaft 10 is entirely aligned with the engine output axis of rotation, the splines of receiver 11 can be sized and spaced to exactly match and mate with the cross-sectional profile of the teeth 20 shown in FIG. 5. For vehicle layouts where the drive shaft is offset 2° from the engine output axis of rotation, an assembly process can be used wherein the spline shaft head 19 has its axis of ration aligned with the receiver 11 axis of rotation during insertion into the receiver 11, and thereafter the spline shaft head 20 pivoted to the 2° offset angle. During such aligned insertion into the receiver 11, there must be a slight clearance on all sides of the teeth 20 relative to the receiver 11. For instance, the cylinder defined by the receiver teeth end faces may have a diameter of 28.54 mm (clearance relative to the minor diameter d of 28.5 mm), the cylinder defined by the between-teeth-recess-faces of the receiver 11, 16 may have a diameter of 32.04 mm (clearance relative to the major diameter D of 32 mm), and the space separating teeth of the receivers 11, 16 may be 2.54 mm (clearance relative to the tooth width w of 2.5 mm). When the spline shaft head 20 is pivoted to the 2° offset angle, the clearance is taken up. For vehicle layouts where the drive shaft is offset up to 14° from the engine output axis of rotation, the receiver 11 is sized with its spline teeth with a significantly greater clearance relative to the teeth 20, thereby allowing the pivoting to the 14° offset angle before the clearance is taken up between the respective teeth.

Although the present invention has been described with reference to preferred embodiments, workers skilled in the art will recognize that changes may be made in form and detail without departing from the spirit and scope of the invention.

The invention claimed is:

1. A drive shaft for transmitting torque generated from an engine in a wheeled land vehicle toward its wheels, comprising:
   a middle tubular section which is hollow and of sufficient size to transfer the torque for the wheeled land vehicle; and
   two spline shaft heads which are respectively welded to both ends of the middle tubular section, the spline shaft heads being receivable in a splined drive end connector and a splined driven end connector, the spline shaft heads having crowned teeth which are crowned relative to a longitudinal axis of the drive shaft to permit an angular offset of at least 1° or more of the drive shaft relative to the connectors;
   wherein the drive shaft extends between and with engagement to each of the splined drive end connector and the splined driven end connector, wherein the splined drive end connector comprises a first drive sleeve, a bundle ring and a corrugated sleeve, and wherein the splined driven end connector comprises a straight cover and a second driving sleeve, and wherein the two spline shaft heads each include a shaped profile for contact with the corrugated sleeve or the straight cover.

2. A drive shaft for transmitting torque generated from an engine in a wheeled land vehicle toward its wheels, comprising:
   a middle tubular section which is hollow and of sufficient size to transfer the torque for the wheeled land vehicle, wherein the middle tubular section has an outer diameter; and
   two spline shaft heads which are respectively welded to both ends of the middle tubular section, the spline shaft heads being receivable in a splined drive end connector and a splined driven end connector, the spline shaft heads having crowned teeth which are crowned relative to a longitudinal axis of the drive shaft to permit an angular offset of at least 1° or more of the drive shaft relative to the connectors, wherein the crowned teeth have a major diameter which is no greater than the outer diameter of the middle tubular section.

3. The drive shaft of claim 2, wherein the major diameter of the crowned teeth matches the outer diameter of the middle tubular section.

4. A drive shaft for transmitting torque generated from an engine in a wheeled land vehicle toward its wheels, comprising:
   a middle tubular section which is hollow and of sufficient size to transfer the torque for the wheeled land vehicle; and
   two spline shaft heads which are respectively welded to both ends of the middle tubular section, the spline shaft heads being receivable in a splined drive end connector and a splined driven end connector, the spline shaft heads having crowned teeth which are crowned relative to a longitudinal axis of the drive shaft to permit an angular offset of at least 1° or more of the drive shaft relative to the connectors, wherein a difference between major diameter and minor diameter of the crowned teeth is in the range of 1 to 8 mm and wherein a length of the crowned teeth is greater than the difference between major diameter and minor diameter and within a range of 2 to 20 mm.

5. A drive shaft for transmitting torque generated from an engine in a wheeled land vehicle toward its wheels, comprising:
   a middle tubular section which is hollow and of sufficient size to transfer the torque for the wheeled land vehicle; and
   two spline shaft heads which are respectively welded to both ends of the middle tubular section, the spline shaft heads being receivable in a splined drive end connector and a splined driven end connector, the spline shaft heads having crowned teeth which are crowned relative to a longitudinal axis of the drive shaft to permit an angular offset of at least 1° or more of the drive shaft relative to the connectors, wherein the crowned teeth have a non-linear side face curvature relative to a direction normal to the longitudinal axis of the drive shaft.

6. The drive shaft of claim 5, wherein a side face radius of curvature of each of the crowned teeth exceeds a radius of curvature of a major diameter of the crowned teeth.

7. The drive shaft of claim 5, wherein each crowned tooth has a crown radius of curvature which exceeds a radius of curvature of a major diameter of the crowned teeth.

8. The drive shaft of claim 7, wherein each crowned tooth has a crown radius of curvature which exceeds the major diameter of the crowned teeth.

9. The drive shaft of claim 8, wherein the major diameter of the crowned teeth matches the outer diameter of the middle section.

10. A drive shaft for transmitting torque generated from an engine in a wheeled land vehicle toward its wheels, comprising:
    a middle tubular section which is hollow and of sufficient size to transfer the torque for the wheeled land vehicle; and
    two spline shaft heads which are respectively welded to both ends of the middle tubular section, the spline shaft heads being receivable in a splined drive end connector and a splined driven end connector, the spline shaft heads having crowned teeth which are crowned relative to a longitudinal axis of the drive shaft to permit an angular offset of at least 1° or more of the drive shaft relative to the connectors, wherein each crowned tooth has a crown radius of curvature which exceeds a radius of curvature of a major diameter of the crowned teeth.

11. The drive shaft of claim 10, wherein each crowned tooth has a crown radius of curvature which exceeds the major diameter of the crowned teeth.

12. A drive shaft for transmitting torque generated from an engine in a wheeled land vehicle toward its wheels, comprising:
    a middle section having an outer diameter of sufficient size to transfer the torque for the wheeled land vehicle; and
    a spline shaft head joined at the end of the middle section, the spline shaft head being received in a splined connector defining a cylindrical geared opening, the spline shaft head having crowned teeth which are crowned relative to a longitudinal axis of the drive shaft to permit an angular offset of at least 1° or more of the drive shaft relative to the connector, wherein the crowned teeth each have a non-linear side face curvature relative to a direction normal to the longitudinal axis of the drive shaft, wherein each crowned tooth has a crown radius of curvature which exceeds a radius of curvature of a major diameter of the crowned teeth, wherein each crowned tooth has a crown radius of curvature which exceeds the major diameter of the crowned teeth, and wherein the major diameter of the crowned teeth matches the outer diameter of the middle section.

13. The drive shaft of claim 12, wherein a side face radius of curvature of each of the crowned teeth exceeds a radius of curvature of a major diameter of the crowned teeth.

14. The drive shaft of claim 12, wherein each crown tooth has a crown radius of curvature and a side face radius of curvature, and wherein the crown radius of curvature exceeds the side face radius of curvature.

15. A drive shaft for transmitting torque generated from an engine to a differential in a wheeled all-terrain vehicle, comprising:
    a middle tubular section formed of hollow steel tubing having an outer diameter of sufficient size to transfer the torque for the wheeled land vehicle; and
    two spline shaft heads which are respectively welded directly to both ends of the middle tubular section, a splined drive end connector receiving one of the spline shaft heads; and
    a splined driven end connector receiving the other of the spline shaft heads;
    wherein the spline shaft heads have crowned teeth which are crowned relative to a longitudinal axis of the drive shaft to permit an angular offset of at least 1° or more of the drive shaft relative to the connectors;
    wherein the crowned teeth have a major diameter which is no greater than the outer diameter of the middle tubular section;
    wherein each crowned tooth has a crown radius of curvature which exceeds a radius of curvature of a major diameter of the crowned teeth;
    wherein the crowned teeth each have a non-linear side face curvature relative to a direction normal to the longitudinal axis of the drive shaft; and
    wherein a side face radius of curvature of each of the crowned teeth exceeds a radius of curvature of a major diameter of the crowned teeth.

16. The drive shaft of claim 15, wherein the splined drive end connector comprises a first drive sleeve, a bundle ring and a corrugated sleeve, and wherein the splined driven end connector comprises a straight cover and a second driving sleeve.

17. The drive shaft of claim 15, wherein the major diameter of the crowned teeth matches the outer diameter of the middle tubular section.

18. The drive shaft of claim 17, wherein a difference between major diameter and minor diameter of the crowned teeth is in the range of 1 to 8 mm and wherein a length of the crowned teeth is greater than the difference between major diameter and minor diameter and within a range of 2 to 20 mm.

19. The drive shaft of claim 15, wherein the two spline shaft heads include a central shoulder extending into an inner diameter of the middle tubular section.

* * * * *